United States Patent [19]

Liska et al.

[11] Patent Number: 5,128,217
[45] Date of Patent: Jul. 7, 1992

[54] REDUCED MAINTENANCE NICKEL-CADMIUM STORAGE CELL

[75] Inventors: Jean-Louis Liska, Bordeaux; Claude Madery, Saint Medard en Jalles, both of France

[73] Assignee: SAFT, Romaninville, France

[21] Appl. No.: 635,547

[22] PCT Filed: May 15, 1990

[86] PCT No.: PCT/FR90/00341

§ 371 Date: Jan. 15, 1991

§ 102(e) Date: Jan. 15, 1991

[87] PCT Pub. No.: WO90/14695

PCT Pub. Date: Nov. 29, 1990

[30] Foreign Application Priority Data

May 16, 1989 [FR] France .............. 89 06364
Jan. 8, 1990 [FR] France .............. 90 00114

[51] Int. Cl.$^5$ .............................. H01M 10/30
[52] U.S. Cl. ........................ 429/53; 429/61; 429/206
[58] Field of Search .............. 429/53, 61, 206

[56] References Cited

U.S. PATENT DOCUMENTS

| | | | |
|---|---|---|---|
| 4,650,733 | 3/1987 | Cimino et al. | 429/153 |
| 4,883,727 | 11/1989 | Liska | 429/206 X |

FOREIGN PATENT DOCUMENTS

| | | |
|---|---|---|
| 0231972 | 8/1987 | European Pat. Off. . |
| 1370561 | 7/1964 | France . |
| 1371155 | 7/1964 | France . |
| 2611087 | 8/1988 | France . |
| 8503600 | 8/1985 | PCT Int'l Appl. . |
| 2205989 | 12/1988 | United Kingdom . |

OTHER PUBLICATIONS

Journal of Power Sources, vol. 8, No. 4, Nov. 1982, pp. 403-408, Elsevier Sequoia, Lausanne, Switzerland; J. Mrha et al.: "On the Anomalous Behaviour of Deeply Discharged, Sealed Ni-Cd Cells".

Journal of Power Sources, vol. 19, No. 1, Jan. 1987, pp. 55-66; S. Petrovic et al.: "Oxygen Recombination on Plastic-Bonded Cadmium Electrodes Doped with Nickel (II) Hydroxide".

Journal of Power Source, vol. 14, No. 4, Apr. 1985, pp. 285-293, Elsevier Sequoia, Lausanne, Switzerland: V. Fiala: "Protection of Sealed Ni-Cd Cells from Cell Voltage Reversal".

Patent Abstracts of Japan, vol. 9, No. 302 (E-362) [2025], Nov. 29, 1985; & JP-A-60 140 661 (Shinkoube Denki K.K.).

J. Power Sources, vol. 22, Nos. 3-4, Mar./Apr. 1988, pp. 243-259; David F. Pickett et al., "Advanced Nickel-Cadmium Batteries for Geosynchronous Spacecraft".

Intelec '88, Oct. 30 to Nov. 2, 1988, pp. 522-527; Dr. Klaus Gutzeit: "Sealed Nickel-Cadmium Batteries with Fiber Structured Electrodes".

*Primary Examiner*—Stephen Kalafut
*Attorney, Agent, or Firm*—Sughrue, Mion, Zinn, Macpeak & Seas

[57] ABSTRACT

A reduced maintenance, vented nickel-cadmium storage cell comprising a set of positive electrodes, a set of negative electrodes in which the active mass is consolidated by a polymer, and separators constituted by at least one felt made of a substance selected from a polyamide, polypropylene, polyethylene, individually or mixed together, and without an additional membrane. The inter-electrode distance is in the range 0.2 mm and 0.5 mm, the internal pressure is maintained in the range 0 bars to 0.7 bars, and the cell contains free electrolyte in such a manner as to present a charging characteristic when charging at constant voltage in the temperature range $-30°$ C. to $+60°$ C. that enables the end of charging to be detected because of the existence of a sudden rise in voltage.

7 Claims, 2 Drawing Sheets

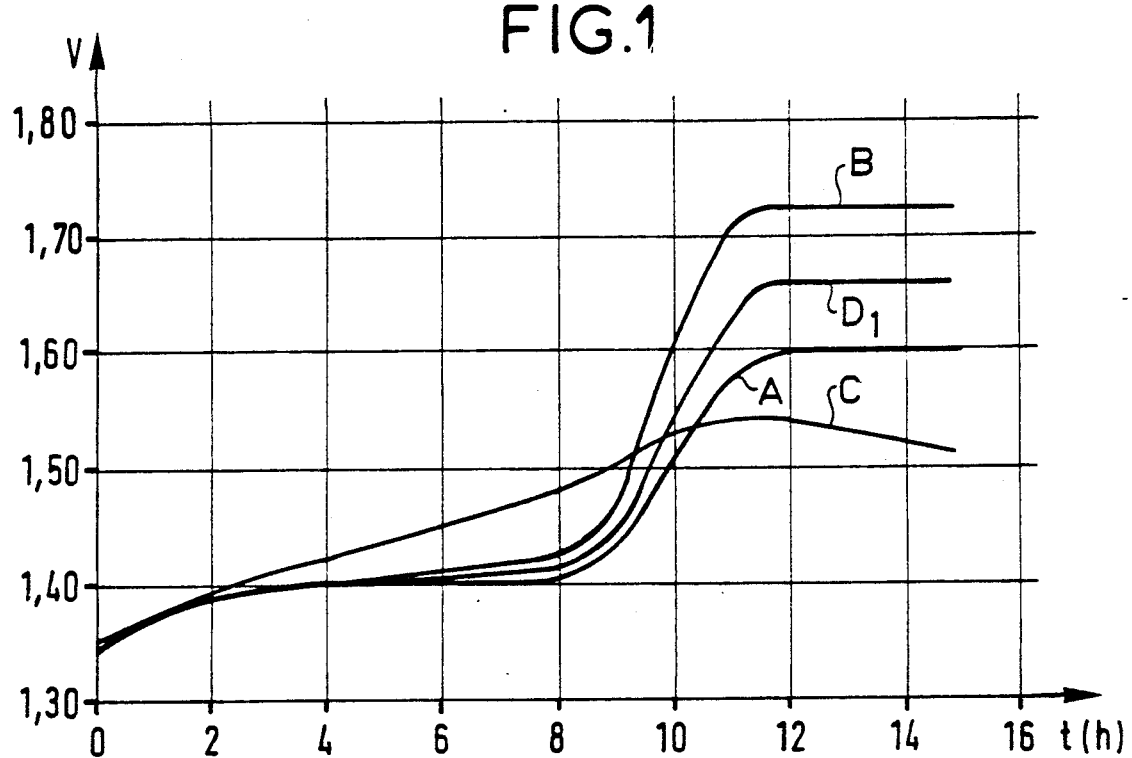
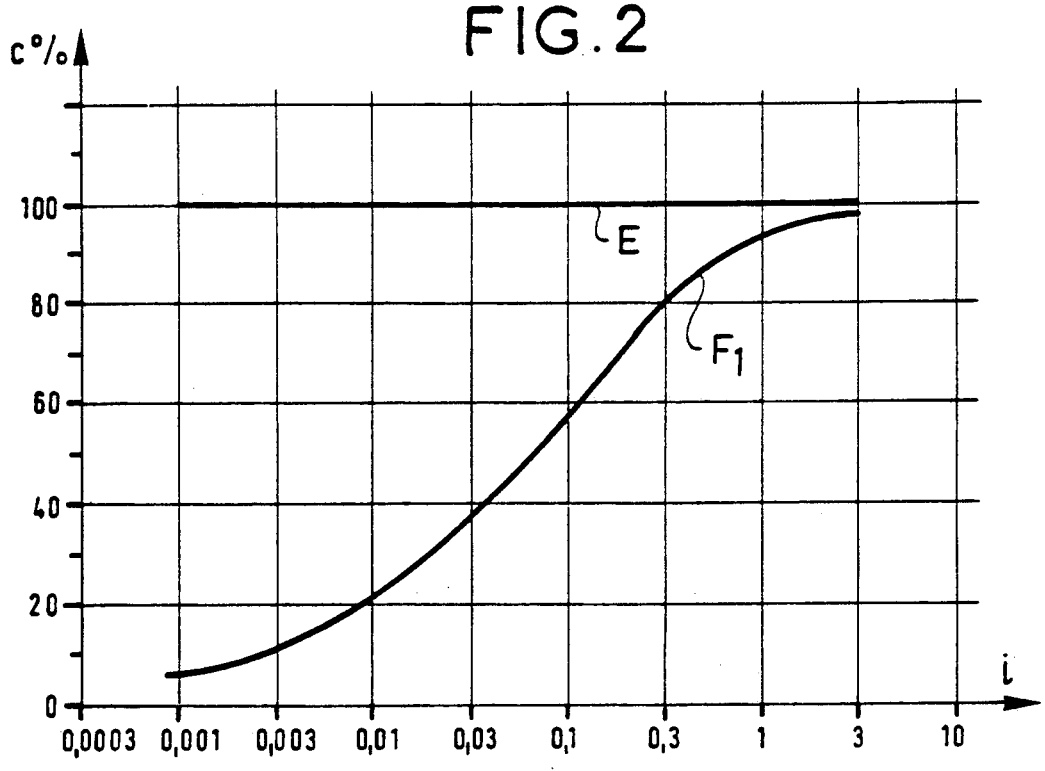

REDUCED MAINTENANCE NICKEL-CADMIUM STORAGE CELL

The present invention relates to a reduced maintenance nickel-cadmium storage cell intended, in particular, for applications requiring high powers for short durations, e.g. in aviation or in back-up power supplies for certain types of equipment.

A first so-called "vented" type of nickel-cadmium storage cell is known for these applications, comprising sintered negative electrodes and positive electrodes with the gap between two successive electrodes being in the range 0.15 mm to 0.4 mm. This gap is filled with a separator comprising felts associated with a cellophane membrane made of grafted polyethylene or of microporous polypropylene. The electrode assembly is enclosed in a case of plastic material containing a certain quantity of free electrolyte. The operating pressure lies in the range of 0.2 bars to 0.7 bars relative pressure, said pressure being controlled by a valve. In its application to aviation, each storage cell, when discharged in 15 seconds at 25° C., presents a power density of 400 watts per kilogram (W/kg) to 700 W/kg.

Most remarkably, such a storage cell presents the following operating characteristic: when charged at constant voltage and limited current, its voltage increases very suddenly at the moment it becomes overcharged. This increase makes it possible for storage cell charging to be self-limiting. This operating characteristic occurs for constant voltage charging regardless of temperature in the range $-20°$ C. to $+60°$ C.

In addition, the storage cell is very reliable throughout its lifetime which may lie in the range 5000 hours (h) to 50,000 h of operation, depending on conditions of utilization. However, it suffers from the drawback of consuming a quantity of water proportional to the overcharge applied thereto. This water consumption must be compensated by periodically adding distilled water, which operation takes the battery out of service and requires human intervention. Water consumption is about 1 $cm^3$ per 3 Ah of overcharge.

A second so-called "vented" type of storage battery is known having sintered positive electrodes and negative electrodes whose active mass is consolidated by a polymer. The negative electrodes are described, in particular, in French patent number FR-A-2 586 407. The gap between two successive electrodes is greater than 0.4 mm and may be as much as 1.5 mm, depending on the application and the desired power density. Power density may lie in the range 50 W/kg to 200 W/kg. The separator may be constituted either by felts associated with a membrane, as in a cell of the first type, or else by a spacer of plastic material, in particular for inter-electrode gaps in the range 0.8 mm to 1.5 mm. This storage cell does not operate under pressure. It has the same advantage as the first type of cell from the point of view charging, being self-limiting over a vast temperature range, and the same drawback from the point of view of water consumption. In addition, it does not meet the power characteristics required for aviation applications.

Sealed nickel-cadmium storage cells are also known having substantially zero water consumption throughout their lifetime. One such cell comprises sintered positive electrodes and negative electrodes consolidated by a polymer, the electrodes being separated by a gap in the range 0.1 mm to 0.2 mm. The separator is a felt of polyamide, polypropylene, polyethylene, or a mixture of these substances. The assembly is installed in a metal container provided with a valve, and operating pressure is usually 3 bars to 4 bars relative to pressure.

Although sealed nickel-cadmium storage cells do not suffer from the drawback of consuming water, as mentioned above, they do not have the very advantageous charging characteristic enabling charging to be self-limiting. Their utilization in the applications outlined above requires sophisticated charging systems in which charge monitoring is essential in order to verify that the pressure is not exceeded and that no electrolyte is lost: any such loss would quickly lead to cell failure.

The object of the present invention is to provide a nickel-cadmium storage cell which retains the advantages of nickel-cadmium cells of the first vented type, while requiring water to be added only at a reduced frequency.

The present invention provides a reduced maintenance nickel-cadmium storage cell including a set of positive electrodes and a set of negative electrodes in which the active mass is consolidated by a polymer or is electro-deposited, the cell being characterized by the facts that:

it includes separators constituted by at least one felt made of a material selected from a polyamide, polypropylene, polyethylene, individually or mixed together, and without an additional membrane;

the inter-electrode distance is in the range 0.2 mm and 0.5 mm;

the internal pressure is maintained in the range 0 bars to 0.7 bars relative pressure; and said accumulator contains free electrolyte above the electrodes;

thereby presenting a charging characteristic when charging at constant voltage, at limited current or at constant current and in the temperature range of $-30°$ C. to $+60°$ C. which makes it possible to detect the end of charging because of the existence of a sudden increase in voltage.

Advantageously, the active mass of the electrodes which are essentially constituted by a mixture of cadmium and cadmium oxide together with a binder contains less than 5% metallic nickel, and preferably 0%.

The inter-electrode distance is preferably in the range 0.2 mm to 0.3 mm.

In a preferred embodiment, said separator includes felts made of polyamide and polypropylene fibers having a diameter lying in the range 4 $\mu$m to 20 $\mu$m, and the felt weights about 70 grams per square meter (g/$m^2$) to 150 g/$m^2$. Felt weight is preferably in the range 90 g/$m^2$ to 120 m/$g^2$.

In such a storage cell, water consumption is divided by a factor in the range 2 to 20, depending on the geometry of the cell and on charging conditions.

Other characteristics and advantages of the present invention appear from the following description of embodiments given by way of non-limiting illustration.

In the accompanying drawings:

FIG. 1 is a graph showing voltage curves V as a function of time t both for prior art cells and for a cell of the invention during charging at the same constant voltage.

FIG. 2 is a graph showing the water consumption of the FIG. 1 cells during overcharging.

Figure 3:
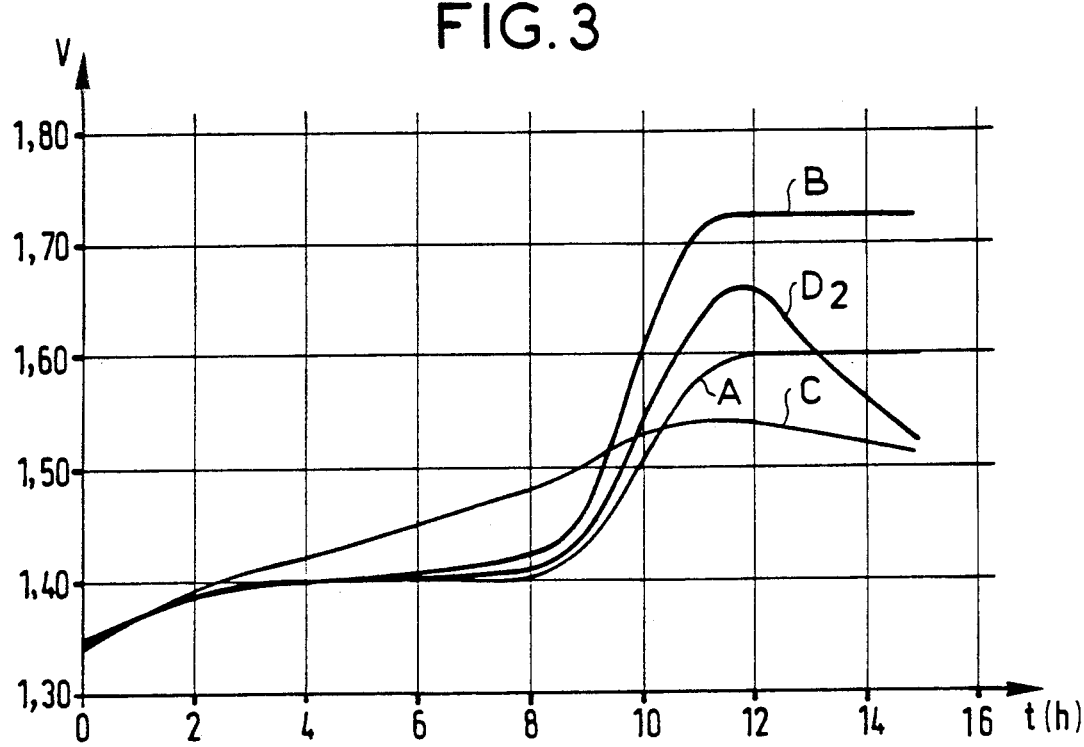
FIG. 3 is a graph showing voltage curves V as a function of time t both for prior art cells and for a variant cell of the invention during charging at the same constant voltage.

Three prior art storage cells A, B, and C are compared with a storage cell $D_1$ of the invention.

Prior art cell A is a vented nickel-cadmium cell for aviation applications, having sintered positive electrodes and sintered negative electrodes. The gap between two successive electrodes is 0.25 mm. The separator is formed by belts associated with a membrane of grafted polyethylene. The operating pressure is 0.4 bars relative pressure.

FIG. 1 shows voltage curve A in volts V, as a function of time t in hours, for said cell A during charging at a constant charging current of 0.1 Cn (nominal capacity) at 20° C. The sudden increase in cell voltage after 9 hours of charging should be noted.

In FIG. 2, curve E shows the water consumption c as a percentage the theoretical consumption for the cell A as a function of overcharging current i expressed as a fraction of Cn.

Prior art storage cell B is a vented nickel-cadmium cell for industrial applications other than in aviation. It includes sintered positive electrodes and negative electrodes which are consolidated by a polymer. The gap between two electrodes is 0.50 mm. The separator is constituted by felts associated with a membrane as in cell A.

Curve B in FIG. 1 shows the variation in the voltage V of cell B as a function of time when it is charged under the same conditions as cell A. A sudden increase in the voltage of the cell B is again observed after 9 hours of charging at constant voltage. Cell B consumes water during overcharging in the same way as cell A, as shown by curve E in FIG. 2.

Prior art storage cell C is a sealed nickel-cadmium cell. Its positive electrodes are sintered and its negative electrodes are polymer consolidated. The gap between two electrodes, equal to 0.20 mm, is filled with polypropylene felt. The electrolyte is limited and the operating pressure is 4 bars relative pressure.

Curve C in FIG. 1 shows the voltage curve for cell C when charged under the same conditions as cells A and B. Unlike cells A and B, it is clear that this voltage has no sudden increase at the end of charging. However water consumption is practically nil.

Storage cell $D_1$ of the invention comprises positive and negative electrodes of the same type as those in cell B. However, its negative mass which is essentially constituted by a mixture of cadmium and cadmium oxide with a binder, is free from metallic nickel. The inter-electrode distance is 0.3 mm. The separator is constituted solely by felts made of polyamide and polypropylene fibers having a diameter of 4 μm to 20 μm. The separator weights about 120 grams per square meter (g/m$^2$). The electrolyte is free above the electrodes. Operating pressure is 0.4 bars relative pressure.

As for cells A and B, curve $D_1$ in FIG. 1 shows a sudden increase in voltage after 9 hours of charging when cell $D_1$ is charged under the same conditions as before. However, its water consumption, as illustrated by curve $F_1$ in FIG. 2, is considerably lower than that of the two preceding cells.

Since curve $D_1$ shows that it is possible for charging to be self-limiting, the overcharging current i (see FIG. 2) can be low and water consumption can be reduced by a factor of up to 10.

In addition to this advantage, cell $D_1$ retains the possibility of being charged at constant voltage at temperatures lying in the range −30° C. to +60° C., and for periods of as long as 24 hours without any danger of thermal runaway.

It has identical discharge characteristics to a prior vented storage cell having the same geometry, and it also has the same lifetime.

FIG. 3 shows prior art curves A, B, and C analogous to those shown in FIG. 1, together with a curve $D_2$ relating to a variant storage cell of the invention.

This storage cell $D_2$ comprises positive and negative electrodes of the same nature as those of cell B. However, the negative active mass which is essentially constituted by a mixture of cadmium and cadmium oxide with a binder is free from metallic nickel. The inter-electrode distance is 0.3 mm. The separator is constituted solely by felts made of polyamide or polypropylene fibers having a majority of fibers with a diameter of 5 μm. The weight of this separator is about 100 g/m$^2$. The electrolyte is free. Operating pressure is 0.4 bars relative pressure.

Figure 4:
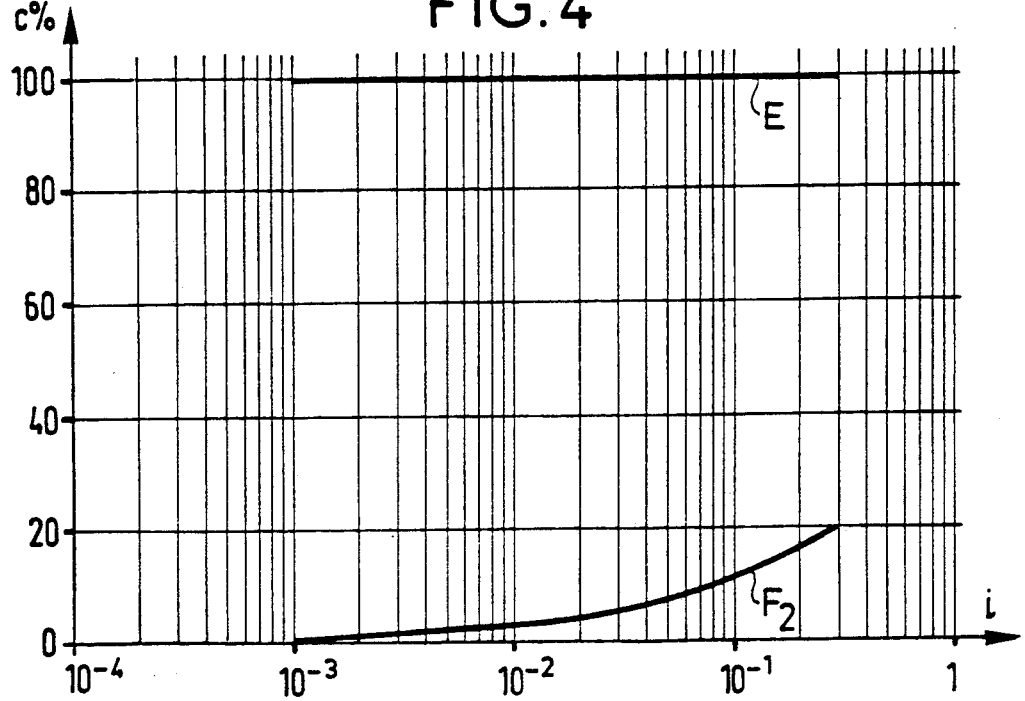
FIG. 4 is a graph showing the water consumption of the FIG. 3 cells during overcharging.

As for cells A and B, curve $D_2$ in FIG. 3 shows a sudden increase in voltage after 9 hours of charging, followed by a progessive reduction, when the storage cell $D_2$ is charged under the same conditions as above. However, its water consumption, shown by curve $F_2$ in FIG. 4, is very considerably lower than that of the two preceding storage cells. This provides a lifetime of 3 to 5 years during which electrolyte levels do not need to be readjusted of 3 to 5 years, e.g. in aircraft batteries.

Curve $D_2$ shows that the end of charging is easily detected by measuring the rise in cell voltage.

In addition to this advantage, cell $D_2$ retains the possibility of being charged at temperatures lying in the range −30° C. to +60° C.

Cell $D_2$ has discharge characteristics which are identical to those of a prior art open cell having the same geometry, and it has the same overall lifetime.

In another example, the inter-electrode distance is equal to 0.5 mm and the weight of the separator felt is 150 g/m$^2$. The charging characteristic of the resulting storage cell is analogous to that of cell $D_2$.

In addition, the positive electrodes of a cell of the invention may be fiber or foam support electrodes or else pocket electrodes.

Batteries of storage cells of the invention having capacities in the range 5 Ah to 1000 Ah are suitable for starting applications requiring high powers, and for equipment back-up applications requiring peak currents for short periods. They may also be used for starting emergency power generators for telephone exchanges, et.

We claim:

1. In a reduced maintenance, vented nickel-cadmium storage cell including a set of positive electrodes and a set of negative electrodes in which the active mass is consolidated by a polymer or is electro-deposited, the improvement wherein:

said cell includes separator constituted by at least one felt made of a material selected from a polyamide, polypropylene, polyethylene, individually or mixed together, and without an additional membrane;

the inter-electrode distance is in the range 0.2 mm and 0.5 mm;

the internal pressure is maintained in the range 0 bars to 0.7 bars relative pressure; and said accumulator contains free electrolyte above the electrodes;

thereby presenting a charging characteristic when charging a constant voltage, at limited current or at constant current and in the temperature range of −30° C. to +60° C. which makes it possible to detect the end of charging because of the existence of a sudden increase in voltage.

2. A nickel-cadmium cell according to claim 1, wherein that the inter-electrode distance is in the range 0.2 mm to 0.3 mm.

3. A nickel-cadmium cell according to claim 1, wherein that said separator includes polyamide and polypropylene fibers having a diameter lying in the range 4 μm to 20 μm, with the weight of the separator lying in the range 70 g/cm$^2$ to 150 g/cm$^2$.

4. A nickel-cadmium cell according to claim 1, wherein that the active mass of the negative electrodes contain less than 5% metallic nickel.

5. A nickel-cadmium cell according to claim 4, wherein that the active mass of the negative electrodes is free from metallic nickel.

6. In a reduced maintenance, vented nickel-cadmium cell including a set of positive electrodes, and a set of negative electrodes in which the active mass is consolidated by a polymer, the improvement wherein:

said cell includes separators constituted by at least one felt of polypropylene and polyamide fibers, without an additional membrane, the weight of the felt being about 120 g/m$^2$, and said fibers having a diameter in the range 4 μm to 20 μm;

the inter-electrode distance is in the range 0.2 mm to 0.3 mm;

the internal pressure is maintained in the range 0 bars to 0.7 bars relative pressure; and said cell contains free electrolyte above the electrodes;

thereby presenting a charging characteristic during constant voltage charging in the temperature range −30° C. to +60° C. that enables said charging to be self-limiting.

7. In a reduced maintenance, vented nickel-cadmium storage cell including a set of positive electrodes, and a set of negative electrodes in which the active mass is consolidated by a polymer or is electro-deposited, the improvement wherein:

said cell includes separators constituted by at least one felt made of a substance selected from a polyamide, polypropylene, polyethylene, individually or mixed together, and without an additional membrane;

the inter-electrode distance is in the range 0.2 mm to 0.3 mm;

said felts have a weight lying in the range 90 g/m$^2$ to 120 g/m$^2$ and are made of fibers, the majority of which have a diameter of 5 μm;

the internal pressure is maintained in the range 0 bars to 0.7 bars relative pressure; and said cell contains free electrolyte above the electrodes;

thereby presenting a charging characteristic when charging in the temperature range −30° C. to +60° C. enabling the end of charging to be detected by measuring the rise in voltage.

* * * * *